United States Patent
Sidaine et al.

(10) Patent No.: US 7,062,821 B2
(45) Date of Patent: Jun. 20, 2006

(54) CLAMPING COLLAR

(75) Inventors: Benoit Sidaine, Prunier (FR); Cyriaque Fouqueray, Romorantin Lanthenay (FR); Patrick Goulet, Gievres (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 10 days.

(21) Appl. No.: 10/450,924

(22) PCT Filed: Dec. 11, 2001

(86) PCT No.: PCT/FR01/03916

§ 371 (c)(1),
(2), (4) Date: Jun. 13, 2003

(87) PCT Pub. No.: WO02/50468

PCT Pub. Date: Jun. 27, 2002

(65) Prior Publication Data

US 2004/0025305 A1    Feb. 12, 2004

(30) Foreign Application Priority Data

Dec. 19, 2000 (FR) .................................. 00 16614
Nov. 28, 2001 (FR) .................................. 01 15358

(51) Int. Cl.
*F16L 33/035* (2006.01)

(52) U.S. Cl. .................. 24/20 TT; 24/20 R; 24/20 EE

(58) Field of Classification Search ................ 24/20 R, 24/20 EE, 20 CW, 20 TT, 20 W, 20 S, 23 EE; 163/942

See application file for complete search history.

(56) References Cited

U.S. PATENT DOCUMENTS

| | | | | |
|---|---|---|---|---|
| 1,411,930 A * | 4/1922 | Peterson | .................... | 24/20 EE |
| 1,551,880 A * | 9/1925 | Holman | ....................... | 248/468 |
| 3,585,743 A * | 6/1971 | Jeffers | .......................... | 40/665 |
| 4,750,241 A * | 6/1988 | Powell | ...................... | 24/20 EE |
| 4,924,558 A * | 5/1990 | Calmettes et al. | ........ | 24/20 CW |
| 4,996,749 A * | 3/1991 | Takahashi | .................... | 24/20 R |
| 5,353,478 A * | 10/1994 | Spors | .......................... | 24/20 R |
| 5,459,906 A * | 10/1995 | Detable et al. | .............. | 24/20 R |
| 5,530,996 A * | 7/1996 | Calmettes et al. | ........... | 24/20 R |
| 5,553,358 A * | 9/1996 | Calmettes et al. | ......... | 24/20 TT |
| 5,669,113 A * | 9/1997 | Fay | .......................... | 24/20 CW |
| 5,855,044 A * | 1/1999 | Cradduck | .................... | 24/20 R |
| 5,918,350 A * | 7/1999 | Detable et al. | ............ | 24/20 TT |
| 6,343,407 B1 * | 2/2002 | Muto et al. | .................. | 24/20 R |
| 6,389,650 B1 * | 5/2002 | Yamada et al. | .............. | 24/20 R |
| 6,568,043 B1 * | 5/2003 | Detable et al. | .............. | 24/20 R |

FOREIGN PATENT DOCUMENTS

EP    0 636 826 A    2/1995

* cited by examiner

Primary Examiner—Jack W. Lavinder
(74) Attorney, Agent, or Firm—Cabinet Beau de Lomenie

(57) ABSTRACT

A clamping collar having a hook (22) suitable for being clipped onto a lug (12) in the clamped state. The collar has a tongue (14) secured to the end that carries the hook (22). The lug (12) has a free edge (12A) which, when the collar is in the unclamped state, faces towards the hook (22), and the tongue carries at least one retaining member (26A, 26B) which, when the collar is in the unclamped state, lies in a cavity (28) provided under the lug (12) and co-operates with the free edge thereof. The tongue also has a guide embossed region (40) in alignment with the free edge of the lug to guide said lug during hooking and/or to form an abutment for the hook.

33 Claims, 4 Drawing Sheets

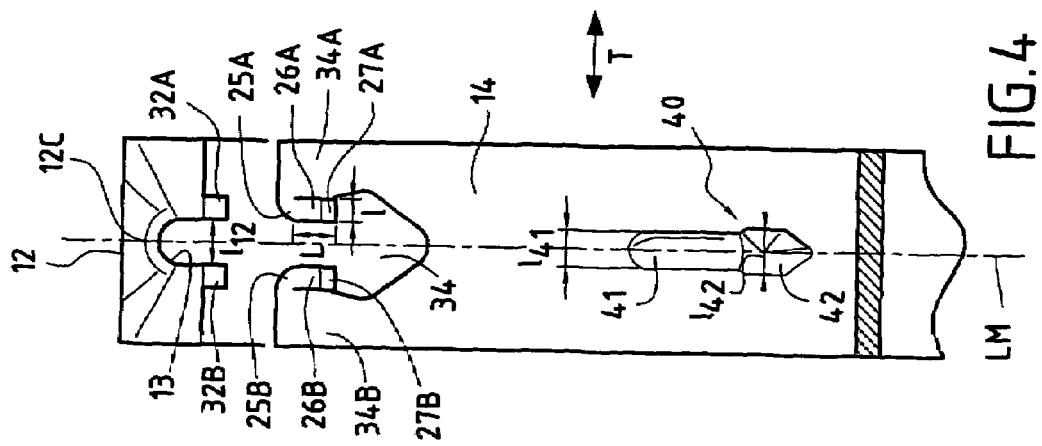
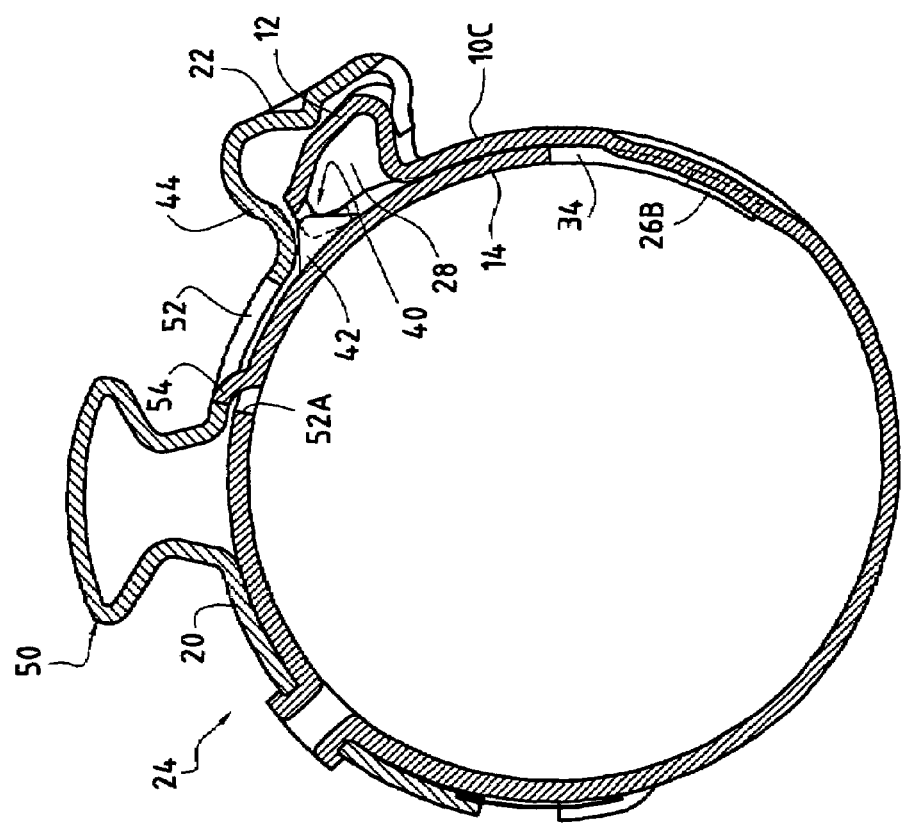

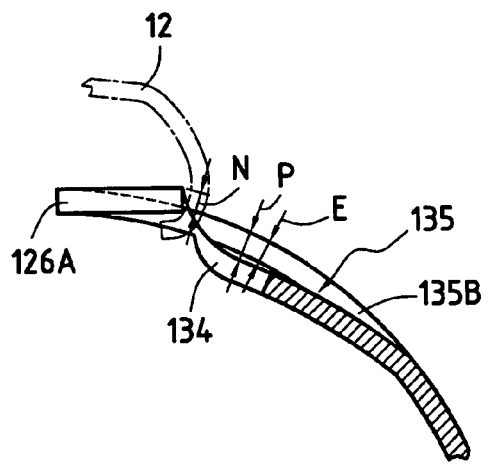
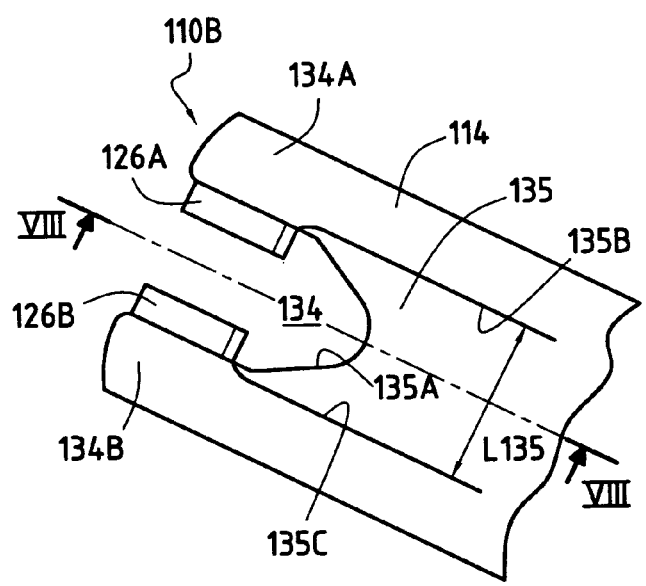

CLAMPING COLLAR

The present invention relates to a clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar further comprising a tongue which is secured to the first end of the collar and which, in said unclamped state, extends substantially around the periphery of the collar, between the hook and the lug, the collar further comprising pre-hooking means suitable, when the collar is in the unclamped state, for retaining said tongue relative to the second end of said collar in order to close said collar.

A collar of this type is known, for example, from Patent Application FR-A-2 729 733. For example, the lug and the tongue are formed at respective ones of the two free ends of an "inner" first strip portion, while the hook is formed at the free end of an "outer" second strip portion fixed to the inner portion in the region of the tongue.

In order to simplify the description, it is considered in general that such strip portions defined by way of example with reference to Patent Application FR-A-2 729 733 constitute means forming a strip of metal rolled up on itself. By convention, it is considered that the hook and the lug are respectively formed at the first end and at the second end of such means forming a strip of metal.

In Patent Application FR-A-2 729 733, the pre-hooking means comprise a longitudinal slot which is situated beyond the lug and a stud such as a radially folded tip which projects from the tongue and which penetrates into said slot.

The tongue must have sufficient length to extend under the lug to a zone situated behind the lug in the direction going towards the first end of the collar, in which zone the above-mentioned longitudinal slot is provided. That requires use of an amount of material that is relatively large compared with the working clamping length of the collar. In order to reduce said length, it is preferable to situate the longitudinal slot immediately behind the lug in the direction going towards the first end of the collar. Said window thus lies in a zone which is subjected to considerable stress while the collar is being clamped. Because of the presence of the slot, the strength of the strip in said zone is reduced locally, which is disadvantageous since it is subjected to high stresses during clamping.

In any event, as indicated above, the tongue is relatively long, which means that a considerable amount of material is used to make the collar. In addition, this is problematic for collars of small diameters, for which the length of the tongue sometimes represents a non-negligible portion of the periphery of the object to be clamped, e.g. about ⅓ of said periphery. During clamping, it is difficult to constrain the tongue to move relative to said object over a given length while taking up the suitable curvature.

An object of the invention is to improve the above-mentioned prior art and to remedy those drawbacks, at least in part.

This object is achieved by the fact that the lug has a free edge which, when the collar is in the unclamped state, faces towards the hook, and by the fact that the tongue carries at least one retaining member which, when the collar is in the unclamped state, lies in a cavity provided under the lug and co-operates with the free edge thereof.

By means of these provisions, the retaining member carried by the tongue co-operates directly with the free edge of the lug rather than co-operating with any window provided in the strip formed by the collar. This makes it possible to avoid having a large-size window situated in the strip portion that is immediately adjacent to the lug and behind said lug, which portion is subjected to high stress during clamping. In addition, to make pre-hooking possible, the length of the tongue must be sufficient for the retaining member for retaining said tongue to reach the free edge of the lug, said retaining member advantageously being provided in the immediate vicinity of the free edge of said tongue. It is no longer necessary for the tongue to extend to behind the lug.

Advantageously, the lug is in the form of an undulation whose concave face faces towards the inside of the collar to form said cavity.

The lug is thus shaped simply and, unlike the lug in FR-A-2 429 723 that is formed by two folds touching each other, it is formed by two folds which together form an undulation under which a setback is provided that constitutes the above-mentioned cavity. This undulation is shaped such that (in particular by means of the radii of curvature that it has) it corresponds to work-hardening that is sufficient to impart to the lug the stiffness required for clamping the collar.

Advantageously, the retaining member projects relative to the tongue towards the outside of the collar.

In an advantageous embodiment, the tongue carries at least one retaining member formed by a tab cut out from said strip and upstanding relative to said strip so as to have a free end facing towards said hook.

This retaining tab is formed by a simple cutting-out and partial folding operation which is compatible with high production throughputs.

In which case, advantageously, the free edge of the lug has a folded-back lip suitable for engaging at least in part under said tab.

The free edge of the lug may be folded back slightly inwards so as to have an inclination preventing the retaining member from disengaging from it. However, it is possible to choose to implement each of the folded-back lips in the form of a locally folded-back portion. For example, the free edge may have one or more folded-back tabs or extensions that are folded back inwards so as to form the folded-back lip(s).

The invention also provides a clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar further comprising a tongue which is secured to the first end of the collar and which, in said unclamped state, extends substantially around the periphery of the collar, between the hook and the lug.

In above-mentioned Patent Application FR-A-2 729 733, the hook is integral with an outer strip portion which is fixed to the inner strip portion which carries the lug and the tongue at respective ones of its two free ends. For the purpose of clamping the collar, the diameter of said collar is reduced by causing the tongue to slide under the lug, and the hook is moved towards said lug until it clips onto it. During that clamping movement, the hook tends to move relative to the tongue insofar as, as shown by FR-A-2 729 733, an undulation forming a reserve of resilience is disposed on the outer strip portion, between the hook and the point at which said outer strip portion is fixed to the inner strip portion. That undulation can open resiliently to enable the hook to move relative to the tongue.

FR-A-2 729 733 proposes abutment means belonging respectively to the outer strip portion and to the zone of the inner strip portion that carries the tongue, for the purpose of limiting the extent to which the reserve of resilience opens to enable the hook to move over the tongue while the collar is being clamped. The reserve of resilience should not be over-stressed while the collar is being clamped because otherwise its elastic limit would be exceeded.

Those provisions have proved to be very effective but, in certain cases in which the clamping force required to hook the hook onto the lug is particularly high, the stresses exerted on the hook can tend to deform said hook non-elastically.

In particular, the hook is formed by folding the strip outwards and, to make the hooking and the clamping reliable, it is necessary to avoid deforming that folding irreversibly during the clamping and hooking operations. Thus, with the collar disclosed by FR-A-2 729 133, there remains a risk that the hooking might not be entirely reliable because the hook might be deformed or the hook might be moved in unwanted manner relative to the tongue.

In addition, the top face of the lug facing the hook constitutes a ramp on which the hook moves during hooking. The hook should be guided properly relative to the lug during this movement and, in FR-A-2 729 733, said top face of the lug is provided with a projection or with a rib, while the free edge of the hook is provided with a notch co-operating with said rib to prevent the hook from moving laterally relative to the lug. Similar provisions can be seen clearly in Document EP-A-0 636 826.

With the collar of FR-A-2 729 733, it has been observed that, in certain extreme situations, such provisions can be insufficient. The hook and the lug are initially spaced apart. While the collar is being clamped, a first diameter-reducing stage is necessary to bring the hook and the lug closer together until they come into contact. Then, the second diameter-reducing stage consists in causing the hook to slide over the lug until it clips behind it. The projection or the rib provided on the lug and the notch provided in the free edge of the hook serve merely to guide the two elements relative to each other during said second diameter-reducing stage. During the first diameter-reducing stage, the tongue slides under the strip end portion that carries the lug, without being guided relative thereto. If, during said first stage, the lug moves slightly transversely relative to the tongue, the lug might come into contact with the hook in a wrong position, which might make hooking difficult or even unreliable.

An object of the invention is to improve the collar disclosed by FR-A-2 729 733 to make hooking more reliable.

This object is achieved by the fact that the lug has a free edge which faces towards the hook when the collar is in the unclamped state, and which is provided with a notch, by the fact that the tongue carries a guide piece in relief which projects from its outside face and which is in alignment with said notch in the direction in which the collar is clamped, and by the fact that the collar has means for accommodating said guide piece in relief when the collar is in the clamped state, under the assembly formed by the lug and by the hook clipped onto said lug.

The guide piece in relief serves to guide the lug along the tongue and/or to form an abutment for the hook.

The guide piece in relief is suitable for performing a guide function because, during the first diameter-reducing stage corresponding to the lug and the hook being brought closer together, it makes it possible to guide the lug (via its notch) relative to the tongue so that the lug is in the desired position for coming into contact with the hook. Then, in the second diameter-reducing stage, the hook may be guided over the lug by suitable shaping of the free edge of said hook and of the top face of the lug.

In addition, any offsetting of the hook on the tongue during hooking is limited by abutting co-operation between the base of the hook and the guide piece in relief.

The guide piece in relief thus constitutes means for assisting in the approach stage of lug prior too hooking, and safety means avoiding undesired deformation of the hook during hooking. Once hooking is achieved, the guide piece in relief does not constitute any impediment because it is accommodated under the assembly formed by the hook and by the lug.

Advantageously, the collar has wedging surfaces suitable for co-operating with the guide piece in relief when the collar is in the clamped state so as to prevent the lug from moving relative to the tongue transversely to the direction in which the collar is clamped.

With these provisions, the guide piece in relief is also used advantageously when the collar is in the clamped state. It enables the collar to be held more securely in the clamped position by preventing the lug from moving relative to the tongue once the hook is hooked to it.

Advantageously, said wedging surfaces comprise the edge of the notch of the lug.

Advantageously, the guide piece in relief is formed by an embossed region.

The invention will be well understood and its advantages will appear more clearly on reading the following detailed description of an embodiment shown by way of non-limiting example. The description refers to the accompanying drawings, in which:

FIG. 2 is a view analogous to the FIG. 1 view, showing the collar in the clamped state;

FIG. 4 is a plan view seen looking in the same direction;

FIG. 7 is a plan view of the tongue of the collar in a variant; and

FIG. 8 is a section view on line VIII—VIII of FIG. 7.

Figure 1:
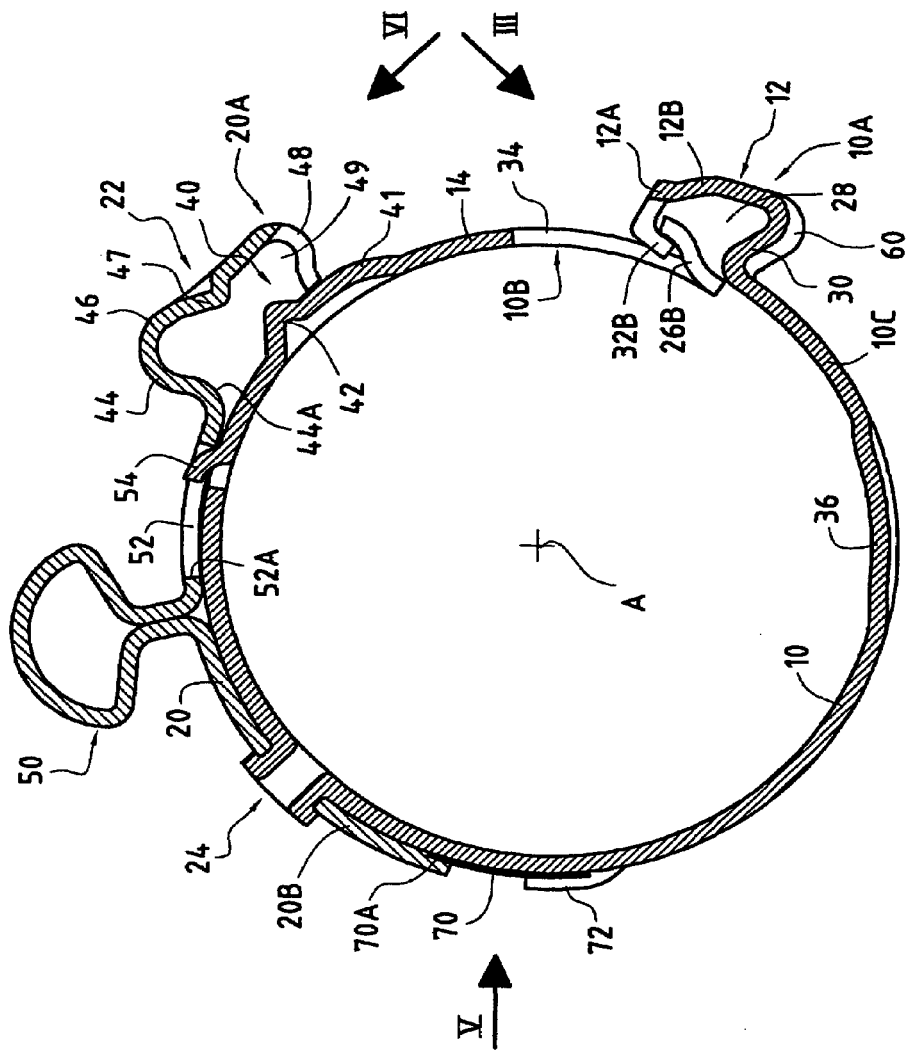
FIG. 1 shows a collar of the invention in its unclamped pre-hooked state, the collar being shown in section on a plane perpendicular to its axis.

As shown in FIGS. 1 and 2, the collar comprises an inner strip portion 10 which is rolled up on itself and which has a first end 10A carrying a lug 12, while its second end 10B carries a tongue 14. The collar further comprises an outer strip portion 20 which, at its free end 20A, carries a hook 22 and which, in the vicinity of its end 20B that is opposite from said hook, is fixed to the inner strip portion 10, e.g. by riveting 24.

Below, the term "inner" is used to describe the elements that are closer to the axis A of the collar, and the opposite term "outer" is used to describe the elements that are further from said axis.

Considered together, the inner and the outer strip portions constitute "means forming a strip of metal rolled up on itself". Below, it is considered that the above-mentioned ends 20A and 10A constitute respectively the first and the second end of said means forming a strip of metal.

In FIG. 1, the collar is shown in the unclamped state, the hook 22 and the lug 12 being spaced apart. In this state, it is nevertheless closed, i.e. its inside periphery forms a closed circle. The inner strip portion 12 is rolled up on itself over more than one turn. For this purpose, the tongue is retained relative to the second end 10A of the collar by pre-hooking means.

The tongue 14 is defined as being an end strip portion which extends under the hook 22 and beyond said hook towards said lug 12. Conventionally, the presence of a tongue makes it possible to avoid any discontinuity in the bearing contact between the strip and the object to be clamped, even in the space formed under the hook.

In this example, the tongue 14 is constituted by the end part of the inner strip portion 10 which extends from the hook 22 towards the free end. It is secured to the first end 20A of the collar by the outer strip portion 20 being fixed to the inner portion.

The free edge 12A of the lug 12 faces towards the hook 22. It forms the free end 10A of the inner strip portion 10. At its free end, the tongue is provided with two retaining tabs 26A and 26B which, in the unclamped state, are engaged under the lug and co-operate with the free edge 12A thereof.

A cavity 28 is provided under the lug 12 which is substantially in the form of an undulation whose concave face faces into the collar. More precisely, and considered starting from an ordinary region of the strip portion 10, the lug has a first fold forming a leg 30 which projects substantially radially from the collar while being inclined slightly backwards (away from the free edge 12A of the lug) so as to form a hookable surface for the free edge of the hook 22. Starting from this leg 30, the top face 128 of the lug extends towards its free edge 12A by forming a bridge of which at least an end part is inclined slightly towards the inside of the collar in the direction going towards the free edge 12A so as to form a ramp which, during hooking, co-operates with the free edge of the hook to make it easier for said hook to clip over the lug onto the leg 30.

The free edge 12A itself has a folded-back lip forming a pre-hooking portion which is inclined towards to the leg 30 on the inside of the lug, so as to engage at least in part under the retaining tab(s) for the purpose of achieving reliable pre-hooking. As can be seen in FIG. 4, insofar as two retaining tabs 26A and 26B are provided, the free edge 12A has two folded-back tabs 32A and 32B co-operating with respective ones of the retaining tabs.

The retaining tabs are connected to the tongue 14 at the free end thereof, and they are slightly upstanding so that their respective free ends 27A and 27B face towards the hook 22.

In order to make the drawing clearer, FIG. 4 shows a position in which the lug 12 does not co-operate with the tabs 26A and 26B. Starting from this open state in which the collar is open, the pre-hooked state in which it is pre-hooked is obtained by causing the lug 12 to slide along the tongue (the tabs 26A and 26B then constituting ramps for the free edge of the lug) until the folded-back tabs 32A and 32B naturally come into engagement under the retaining tabs 26A and 26B.

Figure 6:
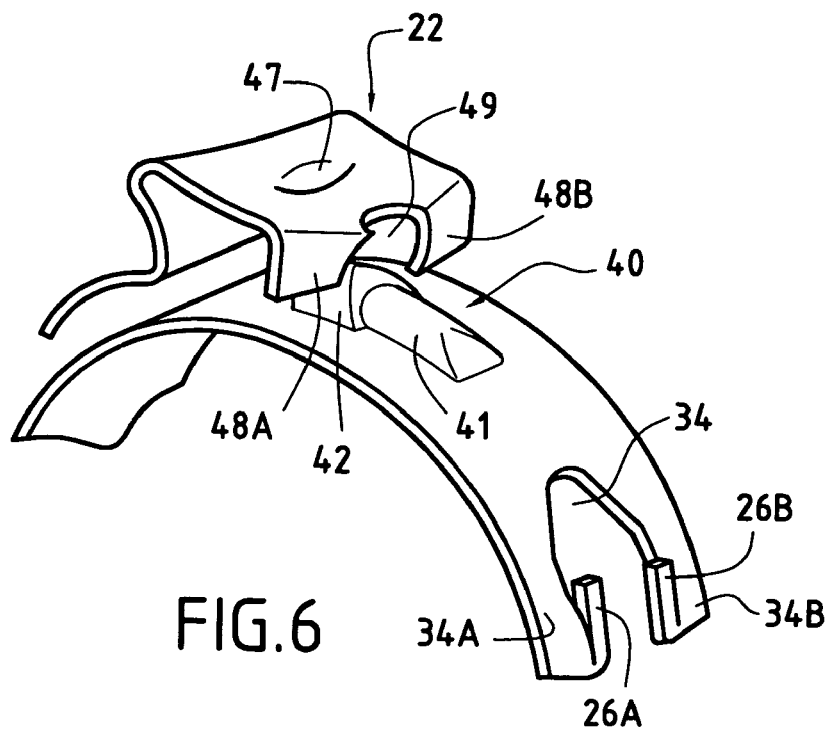
FIG. 6 is a fragmentary perspective view showing the tongue and the hook, seen looking along arrow VI of FIG. 1.

As shown more clearly in FIGS. 4 and 6, the tongue has a fork-shaped free end. A central cutout 34 is provided in the free end of the tongue, leaving the two prongs 34A and 34B of the fork on either side of the cutout. The two prongs 34A and 34B carry respective retaining tabs 26A, and 26B on their facing inside surfaces.

By engaging under the retaining tabs 26A, 26B, the folded-back tabs 32A, 32B penetrate into the cutout 34 and are thus wedged transversely against the longitudinal edges of said cutout. Thus, the lug 12 is wedged transversely relative to the tongue.

On its free edge 12A, the lug 12 is provided with a notch 12C whose function is described below. The folded-back tabs 32A and 32B are formed on respective ones of the two facing edges of said notch.

For example, the collar serves to clamp a pipe that is flexible to some extent, e.g. it is made of rubber or of polyethylene, to a rigid tube. Commonly, the pipe serves to convey fluid and it is necessary to seal the coupling between the pipe and tube. To this end, it is advisable to avoid discontinuity in the bearing contact between inside surface of the collar and the pipe.

For this reason, in a manner known per se, the inner strip portion 10 is provided with a longitudinal bulge 36 that projects slightly from its inside periphery. The bulge is disposed so that, when the collar is clamped, the cutout 34 formed in the free end of the tongue fits into said bulge, on either side of which the prongs 34A and 34B of the fork are situated. At its end further from the lug 12, the bulge is connected progressively to the circle formed by inside periphery of the collar. Thus it serves to "mask" the thickness of the free end of the tongue 14 so as to prevent said tongue from giving rise to discontinuity in the bearing contact.

Similarly, it is advisable to prevent the retaining member, which is, for example, formed by the retaining tabs 26A and 26B, from holding the tongue 14 apart from the inside periphery of the strip 10, when the collar is in the clamped state, so that continuity in the bearing contact between the collar and the object to be clamped is guaranteed.

In a first variant, the retaining member is suitable for being returned substantially into the plane of the tongue under the effect of the pressure exerted on said member by the strip portion 10C situated behind the lug, during clamping of the collar. The retaining member is returned into the plane of the tongue, i.e. it ceases to project relative to the outside face of said tongue and fits into the circle defined by said outside face, as can be seen in FIG. 2.

This first variant is the example shown, in which the retaining tabs 26A and 26B have dimensions that impart the necessary relative flexibility to them. For example, the width 1 of each of said tabs, as measured transversely relative to the strip in which the tongue is formed, is at the most equal to one third of its length L.

In addition, in the zones 25A and 25B in which the tabs are connected to the strip, the work-hardening is sufficiently low to enable the tabs to be flexed when pressure of about 35 newtons per square meter ($N/m^2$) is exerted on them, corresponding to a clamping force of 150 N.

In a second variant (not shown), it is possible to make provision for the strip portion 10C situated behind the lug 12 to have means for accommodating the projecting thickness of the retaining member such as the tabs 26A and 26B. The accommodation means may be constituted by a longitudinal cutout, but that suffers from the drawback of locally reducing the strength of the strip portion 10C. They may also be constituted by a setback formed under a bulge projecting from the outside face of the strip portion 10C.

As shown in FIG. 1, by means of the invention, pre-hooking is possible so long as the tongue 14 extends sufficiently far under the lug 12 for the retaining tabs to be retained in the pre-hooked state by the free edge of said lug. For example, it is necessary merely for the free end of the tongue to extend substantially to the base of the fold that forms the leg 30 of the lug. The length of the tongue is thus reduced considerably compared with its length in the prior art, in which a retaining member formed at the free end of the tongue has to be inserted into a window provided in the portion 10C of the strip in order to make pre-hooking possible. In addition to the substantial saving in material represented by this reduction in length, it enables even collars of small diameter, e.g. lying in the range 16.5 millimeters (mm) to 30 mm, to be equipped with pre-hooking means co-operating with their tongues.

The tongue 14 is provided with a guide piece in relief 40 which projects from its outside face and which, as can be seen more clearly in FIG. 4, is in alignment with the notch 12C in the free edge of the lug 12 in the direction in which the collar is clamped.

In this example, the lug 12 and the strip 14 are formed at the two ends of the same strip portion 10, and the notch 12C and the piece in relief 40 carried by the strip are in alignment in the longitudinal direction of said strip portion, e.g. on its longitudinal middle line LM.

The piece in relief 40 is constituted by an embossed region projecting from the outside face of the tongue. It is possible to choose other types of piece in relief, e.g. a tab or a punched-out tongue that juts out slightly relative to the strip. However, an embossed region offers the advantage of not affecting the strength of the strip and of forming guide surfaces that slope gently.

When the collar is in the clamped state, shown in FIG. 2, the embossed region 40 is accommodated under the assembly formed by the lug and by the hook clipped thereover. During hooking, the lug 12 is engaged under the hook 22 which is clipped onto it. The embossed region 40 is then engaged in the cavity 28 provided under the undulation that is formed by the lug 12. However, as shown in FIG. 2, a portion 42 of the embossed region 40 extends beyond the notch 12C in the free edge of the lug and co-operates with the hook.

Considered in the direction going towards its free edge, the hook comprises a first fold upstanding relative to the strip portion 20 to form a leg 44 that is substantially radial. Starting from the end of said leg, the hook forms a bridge 46 that is substantially parallel to the periphery of the collar. That end of said bridge which is opposite from the leg 44 is folded back inwards to form a second leg 48 which constitutes the hooking edge of the hook for hooking onto the lug. The inclination of said second leg is such that, in the hooked position, it is substantially parallel to the hookable leg 30 of the lug.

While the collar is being clamped and hooked together, the hook moves over the tongue in the direction going towards the free end of said tongue. In order to limit this movement, the portion 42 of the embossed region 40 that projects beyond the notch 12C in the free edge of the lug co-operates with the base 44A of the hook, said base being situated, on the inside face of the strip portion 20, in a zone of the leg 44 that is adjacent to the tongue.

The outer strip portion 20 is provided with an undulation 50 which, as can be seen by comparing FIGS. 1 and 2, tends to open while the collar is being clamped. The abutment means known from FR-A-2 729 733 are provided to limit the opening of said undulation and to ensure that it does not go beyond its elastic limit. The abutment means comprise a window 52 provided in the strip portion 20, between the undulation 50 and the hook 22, and a stud 54, which is provided in the inner strip portion 10, in the vicinity of the tongue, so as to be engaged in said window. When the undulation 50 is in its maximum opening situation, said stud 54 co-operates with the abutment edge 52A of the window 52 that is adjacent to the undulation 50.

The embossed region 42 co-operates with the base 44A of the hook to ensure that, once the stud 54 has come into abutment against the edge of the window 52A, excessive stress on the hook cannot tend to deform it plastically by causing it to tilt and by "unrolling" the fold that attaches the leg 44 to the ordinary part of the strip 20, which would modify irreversibly the geometrical shape of the hook and could adversely affect the hooking quality.

While the collar is being clamped, the lug 12 moves over the strip 14 in the manner indicated above. The embossed region 40 makes it possible to guide this relative movement effectively, at least when the lug reaches the vicinity of the hook. Because of the notch 12C, the free edge of the lug straddles the embossed region 40, thereby preventing the tongue and the lug from moving relative to each other in a direction T that is transverse to the longitudinal direction of the strip portion 10. Naturally, the height and width dimensions of the notch are at least substantially equal to those of the embossed region.

The embossed region 40 has a first portion 41 which is progressive. While the collar is being clamped, the notch 12C firstly straddles said first portion. It can be seen that the width $l_{41}$ of said first portion 41 is smaller than the maximum width $l_{42}$ of the embossed region 40, which maximum width is itself substantially equal to but slightly smaller than the width $l_{12}$ of the notch 12C. All of these widths are measured transversely to the longitudinal direction of the strip.

Thus, even if the lug is offset slightly transversely relative to the tongue, the first portion 41 makes it possible to put it back on the axis without opposing the clamping. The embossed region 40 has its maximum width in its second portion 42. In the hooked state, said second portion 42 is situated in the notch 12C. Thus, the edge 13 of the notch co-operates with the part 42 of the embossed region to wedge the lug relative to the tongue when the collar is in the clamped state.

The first part 41 of the embossed region thus makes it possible to guide the lug as it moves towards the hook, while the collar is being clamped. The second part 42 makes it possible firstly to avoid excessive deformation of the hook and secondly to wedge the lug relative to the tongue when the collar is in the clamped state.

In a manner known per se, the top face 12B of the lug makes it possible to guide the hook relative to said lug during clipping. For this purpose, the free edge 48 of the hook is itself provided with a notch 49 situated in a middle portion, i.e. said notch is substantially in line with the notch 12C in the lug. At the vertex of the notch 12C, the edge 13 of said notch is slightly raised so as to form a projection 13' onto which the notch 49 in the hook engages. The two prongs 48A and 48B on the free edge of the hook that remain on either side of the central notch 49 in said hook are inclined slightly towards its base 44 so as to be guided by the top face 12B of the lug, on either side of the projection 13'.

In addition, on its back face for retaining the hook, i.e. on the outside face of its leg 30, the lug is provided with a wedging bulge 60. When the collar is in the hooked state, the notch 49 in the free edge of the hook straddles the bulge 60, so that the hook is securely wedged transversely relative to the lug.

Under the lug 12, the bulge 60 forms a setback into which, as can be understood by looking at FIG. 2, the embossed region 40 engages in part when the collar is in the clamped state. More precisely, it is the first part 41 of said embossed region that is engaged in said setback. This further improves the wedging of the lug relative to the tongue.

It should also be noted that the bridge 46 of the hook is provided with a stiffener indent 47 that projects from its inside face. When the collar is in the hooked state, said indent comes into position behind the projection 13'.

Figure 5:
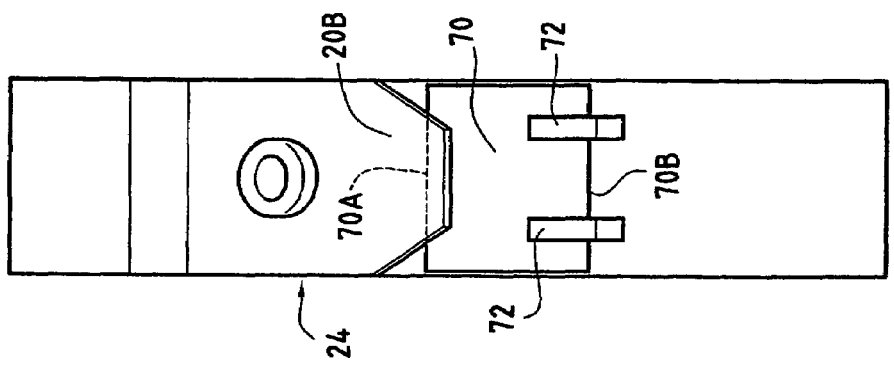
FIG. 5 is a plan view seen looking along arrow V in FIG. 1.
Figure 3:
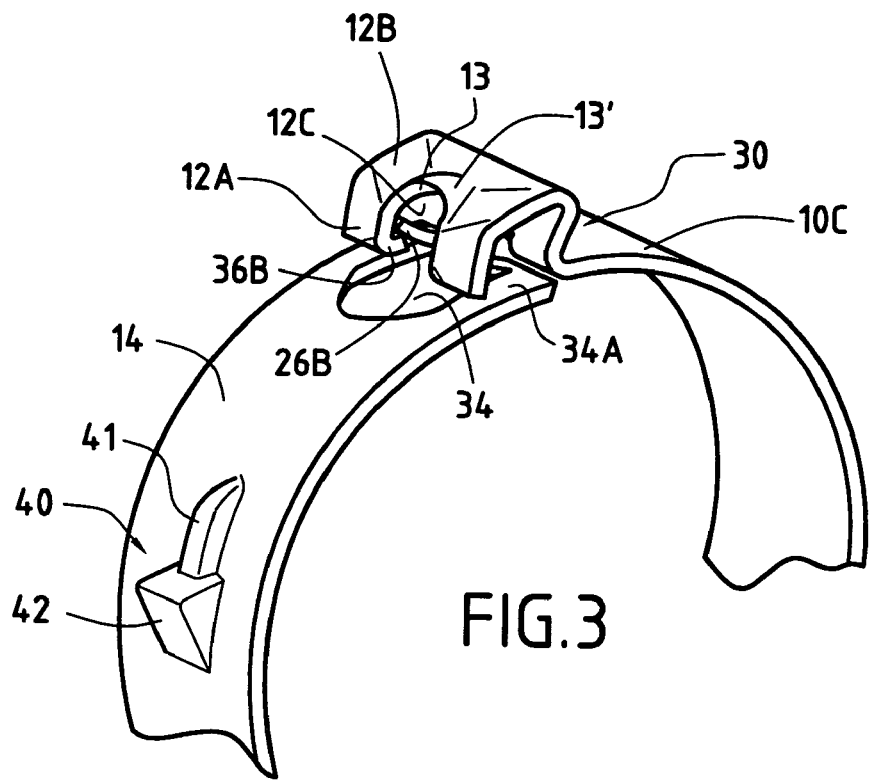
FIG. 3 is a fragmentary perspective view of the collar, without the hook, seen looking in the direction III of FIG. 1.

As can be seen more clearly in FIG. 5, the collar has a label 70 which is held on the collar by being wedged under at least one holding tab 72 formed by cutting out and folding the means forming the strip of the collar. In this example, two tabs 72 are cut out from the inner strip portion 10 and are slightly upstanding relative to said strip portion in order to enable the label 70 to be engaged under them, and they are then brought back into the plane of the strip to wedge the label. For example, the label 70 may be formed merely by a strip of colored plastic which, for the user, constitutes a marker for identifying the collar. For example, a different color is chosen for each collar diameter.

In the collar shown in the figures, the existence of the outer strip portion 20 is used advantageously for holding the label. As can be seen in FIG. 5, the label is wedged along a first edge 70A between the inner and the outer strip portions (under the free end 20B of the outer portion which lies beyond the riveting zone 24) and, along a second edge 70B under the holding tab(s) 72.

In FIGS. 7 and 8, the elements in common with the preceding figures are designated by like references, plus 100.

FIG. 7 shows the second end 110B of the collar, which end carries the tongue 114. The two prongs 134A, 134B of the fork that are situated on either side of the cutout 134 carry respective ones of the retaining tabs 126A and 126B.

The tongue 14 is provided with a dimple 135 setback from its outside periphery. The dimple extends in a central portion of the tongue and it has a depth that decreases progressively from its end 135A that forms the edge of the cutout 134 going away from the end 110A until it reaches zero and comes flush with the outside periphery of the collar.

The width L135 of the dimple is at least substantially equal to the distance L32 (see FIG. 4) measured between the outer edges (i.e. the edges further from the middle line LM) of the folded-back tabs 32A and 32B. Thus, when the collar is in the pre-hooked state, said tabs are situated in the space defined between the two longitudinal edges 135B and 135C of the dimple 135.

While the collar is being clamped, the lug moves over the tongue away from the end 110B. While it is moving in this way, the lug is guided by the folded-back tabs 32A, 32B being held between the edges of the dimple. In addition, the dimple acts as a ramp which, while the collar is being clamped, causes the lug to "rise" progressively along the tongue, thereby avoiding the sensation of reaching a hard spot during clamping.

In FIG. 8, the position of the lug 12 in the pre-hooking position is indicated in dashed lines, the folded-back tabs being retained under the retaining tabs. It can be observed that the maximum depth P of the dimple lies in the range 1.4 times the thickness E of the strip to 2 times said thickness, and that the extent N by which the retaining tabs 125A, 126B project relative to the outside periphery of the tongue is at the most substantially equal to said thickness E.

The invention claimed is:

1. A clamping collar comprising:
    a metal strip rolled up on itself into a generally annular form and having first and second ends respectively provided with a hook and with a lug each of which project radially outwards from the rolled up strip,
    said collar being constructed and arranged to assume one of a clamped position in which the hook is engaged with the lug such that the hook is radially outward of the lug, and an unclamped position in which the hook and the lug are disengaged from one another,
    the first end of the strip having a tongue portion secured thereto which, in the unclamped position extends along a circumferential periphery of the strip in the unclamped position between the hook and the lug,
    the lug having a free edge which opposes the hook in the unclamped position,
    the tongue including at least one retaining member which lies disposed in a cavity defined on a radially inward side of the lug in the unclamped position such that the at least one retaining member cooperates with the free edge of said lug to define pre-hooking means for retaining the tongue relative to the second end of the strip in the unclamped position in order to prevent opening of said collar.

2. A collar according to claim 1, wherein the lug has an undulating cross-sectional form opening generally in a radially inward direction.

3. A collar according to claim 1, wherein the at least one retaining member projects radially outwardly relative to the tongue portion.

4. A collar according to claim 1, wherein the at least one retaining member comprises a tab portion bent relative to the strip so as to have a free end facing towards said hook.

5. A collar according to claim 4, wherein the lug includes a folded-back lip for at least partly engaging the tab portion.

6. A collar according to claim 3, wherein the at least one retaining member can be deflected substantially into the plane of the tongue by a portion of the strip adjacent to the lug in the clamped position.

7. A collar according to claim 3, wherein a portion of the strip adjacent to the lug is provided with means for accommodating a radially projecting extent of the at least one retaining member.

8. A collar according to claim 4, wherein the tongue includes a fork-shaped free end formed by two prongs, each of which carry respective retaining tabs on their facing inside edges.

9. A collar according to claim 1, further comprising a label wedged under at least one holding tab formed by cutting out and folding a portion of the strip.

10. A collar according to claim 9, wherein the strip comprises an inner strip portion and an outer strip portion fixed to said inner strip portion, and wherein a first edge of the label is wedged between said inner and said outer strip portions and second edge of the label is wedged under the at least one holding tab.

11. A collar according to claim 1, wherein a central region of the tongue is provided with a dimple.

12. A clamping collar comprising:
    a metal strip rolled up on itself and having first and second ends provided with a hook and with a lug, respectively, each of which projects radially outwards from the rolled up strip,
    said collar being constructed and arranged to assume one of a clamped position in which the hook is engaged with the lug, end an unclamped position in which the hook and the lug are disengaged,
    the first end of the strip having a tongue portion secured thereto and which extends substantially along a circumferential periphery of the strip between the hook and the lug in the unclamped position, wherein the lug has a free edge which faces towards the hook in the unclamped position the free edge being provided with a notch, the tongue carrying a guide piece which projects from its outside face and which is in alignment with said notch is along the direction in which the collar is clamped, means for accommodating said guide piece in the clamped position being provided under the engaged lug and hook, wherein the tongue includes at least one retaining member which, when the collar is in the unclamped state, lies in a cavity formed on a radially inward side of the lug and co-operates with the free edge of the lug, and the hook also having a radially inward facing cavity in which the lug is disposed in the clamping position.

13. A collar according to claim 12, wherein the lug has an undulating cross-sectional form opening in a generally radially inward direction.

14. A collar according to claim 13, having wedging surfaces suitable constructed and arranged to interact with the guide piece when the collar is in the clamped position so as to prevent the lug from moving relative to the tongue in a direction transverse to that in which the collar is clamped.

15. A collar according to claim 14, wherein said wedging surfaces comprise the edge of the notch of the lug.

16. A collar according to claim 12, wherein the lug has a back face for retaining the hook when the collar is in the clamped position and wherein the lug has a wedging bulge provided on the back face which forms a setback under said lug, the guide piece being at least partly engaged in the setback when the collar is in the clamped position.

17. A collar according to claim 12, wherein the guide piece is constructed and arranged to cooperate with and abut a portion of the hook that is opposite to the free edge of said hook so as to limit a movement of the hook relative to the tongue.

18. A collar according to claim 12, wherein the guide piece comprises an embossed region.

19. A collar according to claim 12, further comprising a label wedged under at least one holding tab formed by cutting out and folding a portion of the strip.

20. A collar according to claim 19, wherein the strip comprises an inner strip portion and an outer strip portion fixed to said inner strip portion, wherein a first edge of the label is wedged between said inner and said outer strip portions and a second edge of the label is wedged under the at least one holding tab.

21. A clamping collar according to claim 12, wherein a central region of the tongue is provided with a dimple.

22. A clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar first end further comprising a tongue which is secured to the first end of the collar and which, in said unclamped state, extends substantially around the periphery of the collar, between the hook end the lug, the lug having a free edge which, when the collar is in the unclamped state, faces towards the hook, and the tongue carrying at least one retaining member which is formed by a tab cut out from said strip and upstanding relative to said strip so as to have a free end facing towards said hook and which, when the collar is in the unclamped state, lies in a cavity provided under the lug and co-operates with the free edge of said lug, so that when the collar is in the unclamped state, said tongue is retained relative to the second end of said collar in order to close said collar, and the hook further having a radially inward facing cavity for receiving the lug therein when the collar is in the clamped state.

23. A collar according to claim 22, having a label held on the collar by being wedged under at least one holding tab formed by cutting out and folding the means forming the strip.

24. A collar according to claim 23, wherein the means forming the strip comprise an inner strip portion and an outer strip portion fixed to said inner strip portion, and wherein the label is wedged along a first edge between said inner and said outer portions and, along a second edge, under at least one holding tab.

25. A collar according to claim 22, wherein the tongue is provided with a dimple in a central region.

26. A clamping collar comprising:

means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar first end further comprising a tongue which is secured to the first end of the collar and which, in said unclamped state, extends substantially around the periphery of the collar, between the hook and the lug.

the lug having a free edge which, when the collar is in the unclamped state, faces towards the hook, and the tongue carrying at least one retaining member which, when the collar is in the unclamped state, lies in a cavity provided under the lug and co-operates with the free edge of said lug, so that, when the collar is in the unclamped state, said tongue is retained relative to the second end of said collar in order to close said collar, wherein the retaining member is deflectable substantially into the plane of the tongue under the effect of the pressure exerted on said member by the strip portion that is situated behind the lug while the collar is being clamped, and the hook further having a radially inwardly facing cavity, for receiving the lug therein.

27. A clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar first end further comprising a tongue which is secured to the first end of the collar and which, in said unclamped state, extends substantially around the periphery of the collar, between the hook and the lug, the lug having a free edge which faces towards the hook when the collar is in the unclamped state, and which is provided with a notch, the tongue carrying a guide piece in relief which projects from its outside face and which is in alignment with said notch in the direction in which the collar is clamped, and the collar having means for accommodating said guide piece in relief when the collar is in the clamped state, under the assembly formed by the lug and by the hook clipped onto said tug, wherein a cavity is provided under the lug, wherein the lug is in the form of an undulation whose concave face faces towards the inside of the collar to form said cavity, the hook further having a cavity, wherein the hook cavity and the lug cavity receive the lug and retaining member, respectively, and wherein the collar has wedging surfaces constructed and arranged to cooperate with the guide piece in relief when the collar is in the clamped state so as to prevent the lug from moving relative to the tongue transversely to a direction in which the collar is clamped.

28. A clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar further comprising a tongue which is secured to the first end of the collar and which, in said unclamped state, extends substantially around the periphery of the collar, between the hook and the lug, the latter having a free edge which faces towards the hook when the collar is in the unclamped state, and which is provided with a notch, the tongue carrying a guide piece in relief which projects from its outside face and which is in alignment with said notch in the direction in which the collar is clamped, and the collar having means for accommodating said guide piece in relief when the collar is in the clamped state, under the assembly formed by the lug and by the hook clipped onto said lug.

wherein a cavity is provided under the lug, and wherein the lug has a back face for retaining the hook when the collar is in the clamped state and wherein, on said back lace, the lug has a wedging bulge which forms a setback under said lug, in which setback the guide piece in relief is engaged at least in part when the collar is in the clamped state.

29. A clamping collar comprising means forming a metal strip rolled up on itself and having first and second ends respectively equipped with a hook and with a lug which project outwards from the collar, said collar being suitable for taking up a clamped state in which the hook is clipped onto the lug, and an unclamped state in which the hook and the lug are spaced apart, the collar further comprising a tongue which is secured to the first end of the collar and which, in said unclamped state, extends substantially around the periphery of the collar, between the hook and the lug, the latter having a tree edge which faces towards the hook when the collar is in the unclamped state, and which is provided with a notch, the tongue carrying a guide piece in relief which projects from its outside face and which is in alignment with said notch in the direction in which the collar is clamped, and the collar having means for accommodating said guide piece in relief when the collar is in the clamped state, under the assembly formed by the lug and by the hook clipped onto said lug, wherein the guide piece in relief is suitable for co-operating in abutment with a region of the hook that is opposite to the free edge of said hook so as to limit a movement of the hook relative to the tongue during clamping.

30. A collar according to claim 29, wherein the guide piece in relief is formed by an embossed region.

31. A collar according to claim 29, having a label held on the collar by being wedged under at least one holding tab formed by cutting out and folding the means forming the strip.

32. A collar according to claim 31, wherein the means forming the strip comprise an inner strip portion and an outer strip portion fixed to said inner strip portion, and wherein the label is wedged along a first edge between said inner and said outer portions and, along a second edge, under at least one holding tab.

33. A clamping collar according to claim 29, wherein the tongue is provided with a dimple in a central region.

* * * * *